July 23, 1946.  R. D. GRIFF  2,404,629
BEET LOADER
Filed Jan. 19, 1944  3 Sheets-Sheet 1
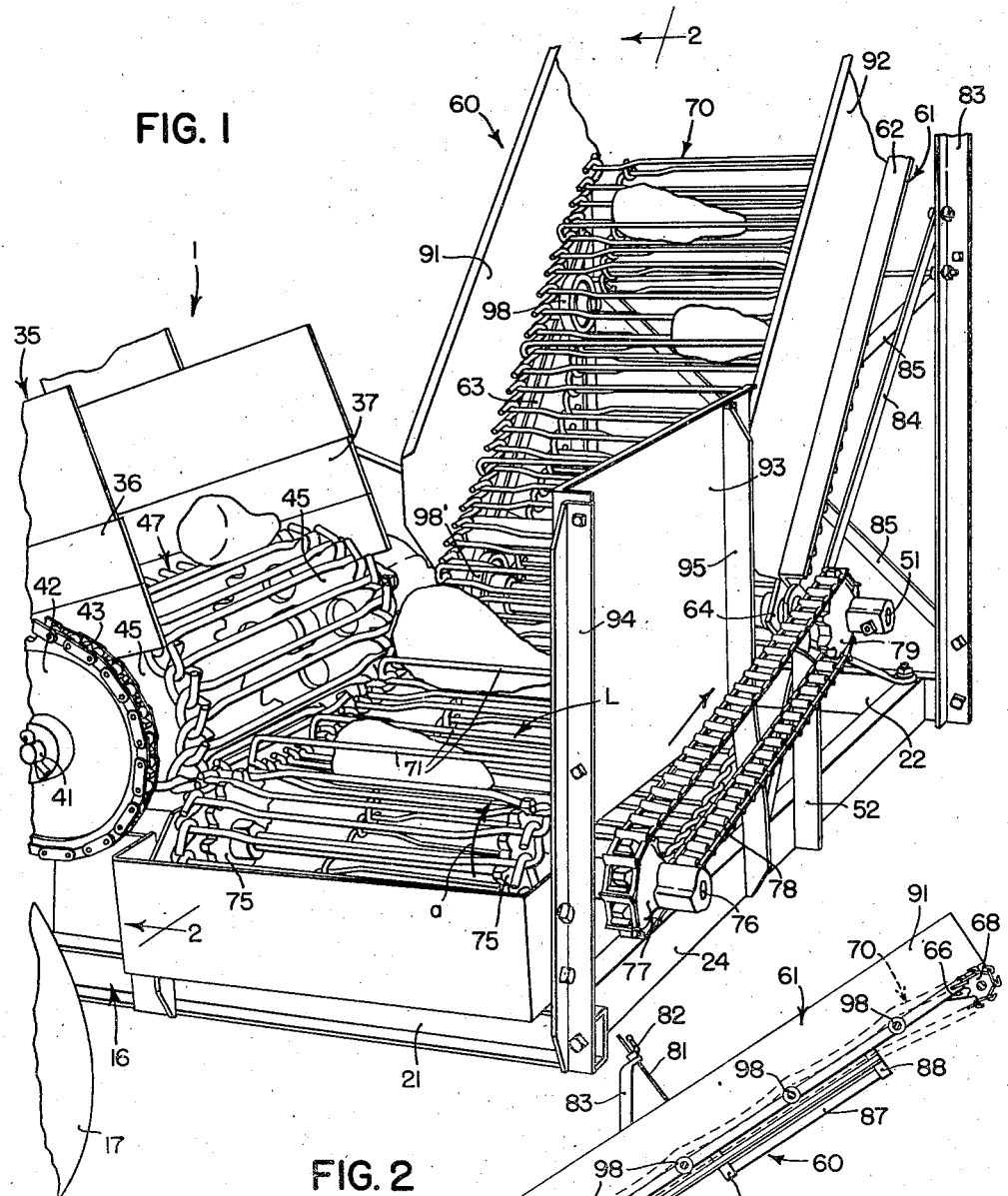
INVENTOR.
ROBERT D. GRIFF
BY
ATTORNEYS

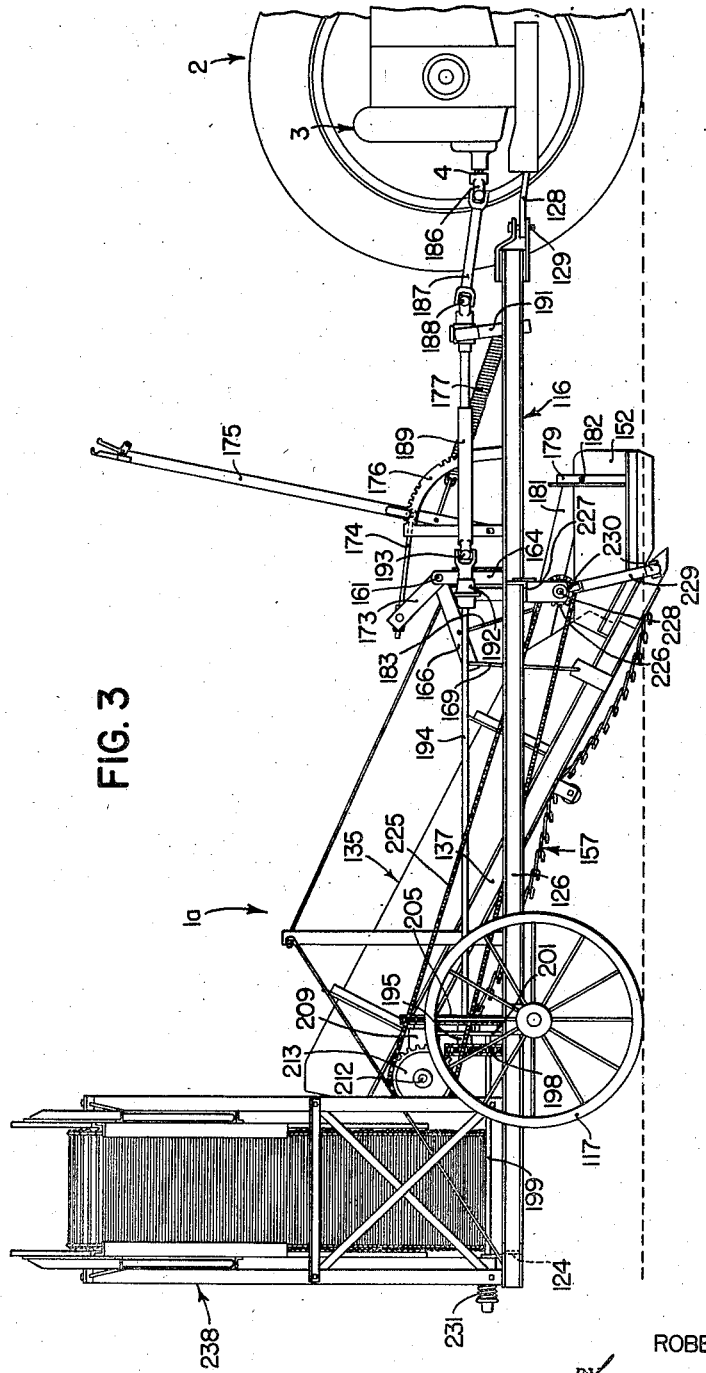

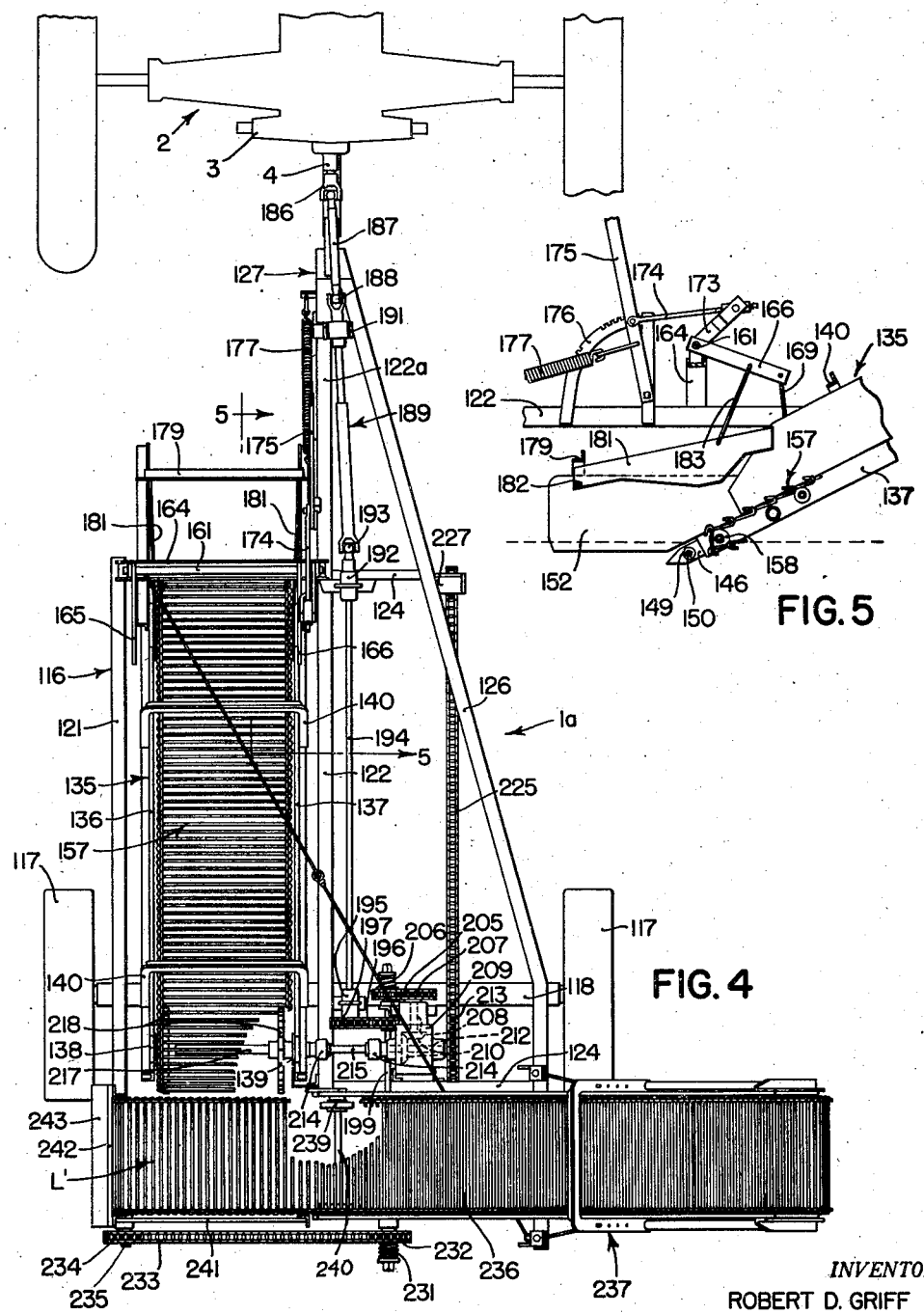

Patented July 23, 1946

2,404,629

UNITED STATES PATENT OFFICE 2,404,629

BEET LOADER

Robert D. Griff, Rock Island, Ill., assignor to Deere & Company, Moline, Ill., a corporation of Illinois Application January 19, 1944, Serial No. 519,070

4 Claims. (Cl. 198—94)

1

The present invention relates generally to loaders for agricultural root crops and the like, such as sugar beets or the like.

The object and general nature of the present invention is the provision of an improved loader for picking up beets from the ground, as from a pile or windrow, and elevating them into a wagon or truck drawn alongside the loader. Further, it is a particular feature of this invention to provide improved conveyor and elevator means for handling the crop and particularly is it a feature of this invention to provide a transverse elevator supported by rotatable members at its upper and lower ends and driven by the lower member, whereby the upper flight or run of the elevator is relatively slack, thereby serving as a receptacle for receiving the beets or other crop.

Another feature of the present invention is the provision of a conveyor or elevator particularly arranged to elevate crop products and the like and to receive the same from another conveyor or other crop handling means, with the lower portion of the upper conveyor arranged with a section supported in a downwardly hanging loop, with driving means for driving the conveyor or elevator arranged at the lower side thereof so that the looped portion will always be present to serve as a receptacle for receiving the crop products. More particularly, it is a feature of this invention to arrange the driving means so as to feed the conveyor elements directly to the looped section so that, even though some of the other supporting elements for the conveyor may become jammed, resulting in a locking of the drive, there will be no tendency for the looped section to become taut and thereby destroy the looped shape of the conveyor.

A further object of the present invention is to provide a beet loader having a simplified arrangement for driving the conveyors and elevators, and a further feature of this invention is the provision of an improved beet loader having automatically adjustable guards for guiding the beets to the loader which are arranged so as not to interfere with a relatively high lift of the front end of the loader when arranging the latter for transport.

These and other objects and advantages of the present invention will be apparent to those skilled in the art after a consideration of the following detailed description, taken in conjunction with the accompanying drawings.

In the drawings:

Figure 1 is a perspective view of the rear portion of a sugar beet loader, in which the principles of the present invention have been incorporated.

Figure 2 is a fragmentary sectional view taken generally along the line 2—2 of Figure 1 and showing the looped section of the upper run of the wagon elevator or conveyor.

Figure 3 is a side view of a slightly different form of beet loader, employing improved driving means for the elevator.

Figure 4 is a plan view of the loader shown in Figure 3.

Figure 5 is an enlarged fragmentary side view showing the improved loader shields.

This application is a continuation-in-part of United States patent application, Serial No. 456,459, filed August 26, 1942, for Beet loader, filed by myself, Claude W. Walz, and Clarence T. Rasmussen.

Referring now to the drawings, more particularly to Figure 1, the beet loader is indicated in its entirety by the reference numeral 1 and is adapted to be propelled by a farm tractor of conventional construction, preferably one having a power take-off shaft and a power lift unit, both driven from the tractor motor. The tractor, with its power lift unit and power take-off shaft, is shown in some detail in the parent application identified above and hence has been omitted from Figure 1. However, in Figures 3 and 4, the tractor is indicated in its entirety by the reference numeral 2 and is shown as equipped with a power lift unit 3 and a power take-off shaft 4.

The loader 1 includes a mobile supporting frame 16 carried on ground wheels 17 by means of an axle or the like. The frame 16 includes a pair of longitudinally extending frame members 21 and 22 connected together at their ends by cross members 24. A conveyor and pick-up unit 35 is carried by the frame 16 between the longitudinal members 21 and 22, the unit 35 including a pair of side bars 36 and 37 held in spaced apart relation by suitable means (not shown). A pair of brackets are fixed, respectively, to the frame members 21 and 22 and pivotally support the rear ends of the side bars 36 and 37 through the medium of a cross shaft 41 to which the rear ends of the side bars 36 and 37 are connected by suitable bearing brackets. The shaft 41 therefore serves as the pivot axis about which the pick-up conveyor unit 35 pivots in a generally vertical direction between the side bars 21 and 22. A sprocket 42 is fixed to the shaft 41 and receives a sprocket chain 43 by which power is transmitted from the power take-off shaft connections to the cross shaft 41. Chain sprockets 44 and 45 are mounted on the shaft 41 and receive the rear end of an elevator or conveyor chain 47 onto which the beets are received. The right end of the shaft 41 extends into a gear box (not shown) enclosing a pair of bevel gears, one carried by the right end of the shaft 41 and the other by the forward end of a generally longitudinally extending shaft 51. The jackshaft 51 is supported for rotation on the frame 16 by suitable front and rear brackets 52.

A wagon elevator unit, indicated in its entirety by the reference numeral 60, is carried at the rear of the implement frame 16 and includes an upwardly and laterally outwardly extending elevator frame 61 comprising parallel side bars 62 and 63, each carrying a bracket 64 at its lower end. The brackets 64 are apertured and pivotally supported on the longitudinal jackshaft 51. Brackets 66 are fixed to the upper ends of the side bars 62 and 63 and receive a shaft 67 on which sprockets 68 (Figure 2) are carried. An endless conveyor or elevator chain 70 is supported at its upper end on the sprockets 68 and at its lower end on sprockets 75 that are fixed to a shaft 76 which is disposed generally longitudinally and supported for rotation on the frame 16 by suitable brackets or the like. A sprocket 77 is fixed to the rear end of the shaft 76 and receives a driving chain 78 which extends laterally across the rear of the machine and is trained over a sprocket 79 that is fixed to the rear end of the longitudinal jackshaft 51. Certain of the links of the chain 70 have outwardly bent sections 71 so as to provide flights to aid in conveying the beets upwardly. The conveyor or elevator 60 is supported for vertical adjustment by a pair of screw-threaded rods 81 (Figure 2) which are connected by cranks 82 to the upper ends of a pair of vertical angles 83 that are fixed at their lower ends to the rear end of the frame 16. The angles 83 are reenforced by suitable bracing 84 and 85. The elevator side bars 62 and 63 carry bumpers which comprise a pair of rollers 87 journaled in brackets 88 that are fixed to the side bars 62 and 63. The rollers 87 are so placed as to be in a position to engage the sides of a wagon or truck in the event it is driven too close to the loader. This prevents any damage to the elevator chain 70 or other parts.

The elevator 60 carries front and rear sides 91 and 92 fixed to the inclined bars 62 and 63, and a rear bang-board or plate 93 which is fixed to a pair of vertically extending angles 94 and 95 fixed at the lower ends of the frame 16.

As best shown in Figures 1 and 2, the wagon elevator chain 70 is not driven from the upper end, as in conventional practice, but is driven from the lower end by the sprockets 75. Normally, the connections with the tractor power lift are such that the shafts 51 and 76 are rotated in a clockwise direction, as viewed from the rear, whereby the sprocket chain 78 moves to the right along its upper flight. Since the sprockets 75 are fixed to the shaft 76, they also are rotated in a clockwise direction, when viewed from the rear, and, as will be seen from Figure 2, this pulls the lower run of the wagon elevator chain 70 taut while the upper or crop receiving run is slack. The elevator 60 is provided with a plurality of idler rollers 98 which support the slack portions of the upper run of the chain 70. The left-hand or generally horizontal portion of the run is unsupported for a space that extends between the sprockets 75 and the idlers 98' which are somewhat larger than the idlers 98 and are carried on the longitudinal jackshaft 51. As will be seen particularly from Figure 1, this distance is appreciable and is somewhat greater than the width of the elevator 47, whereby the upper run of the elevator 70 hangs in a slack downwardly curved loop, indicated by the reference character L, between the sprockets 75 and the rollers 98'. This looped slack portion L therefore serves as a receiver for the beets or other crop coming over the rear end of the conveyor 47. However, as best shown in Figure 2, the length of the chain 70 and the sizes of the idlers 98' and the driving sprockets 75 are such that, even when the lower flight or run is taut, there still remains ample clearance C between the lower portions of the loop L and the lower flight of the chain 70. Since the chain 70 is driven only at its lower end, by the sprockets 75 which are rotated in the direction of the arrow $a$, the crop receiving pocket or loop L is always present when the chain 70 is being driven, notwithstanding changes in the resistance to movement of the chain 70 or changes in the load being carried. This would not be the case if, for example, the chain 70 were driven from the upper end. In that case, the upper run would be vibrated constantly in a generally upward direction and would have a tendency to throw the beets off the conveyor chain because, in such case, any momentary increase in resistance to the rotation of the lower sprockets or the lower portions of the chain would result in immediate tightening of the upper flight or run, thus throwing the beets or other crop off the machine.

A form of beet loader, embodying certain improvements over the form of beet loader shown in the co-pending application identified above, is shown in Figures 3, 4 and 5. Referring now to these figures, the beet loader of Figures 3–5 is indicated in its entirety by the reference numeral $1a$ and is adapted to be propelled by a tractor 2 of conventional construction. The tractor is equipped with a power lift unit 3 and a power take-off shaft 4. The loader $1a$ includes a mobile supporting frame 116 carried on ground wheels 117 by means of an axle 118 or the like. The frame 116 includes a pair of longitudinally extending frame members 121 and 122 connected together at their front and rear ends by cross members 124. The cross members 124 extend laterally to the right and are connected with a third generally longitudinally extending frame member 126 which, cooperating with the forward portion 122a (Figure 4), forms a forward hitch section 127 that is connected to the drawbar 128 of the tractor by a coupling pin 129.

A conveyor and pick-up unit 135 is carried by the frame 116 between the longitudinal members 121 and 122, the unit 135 including a pair of side bars 136 and 137 held in spaced apart relation by suitable means, such as U-shaped cross braces 140 (Figure 4). A pair of brackets 138 and 139 are fixed, respectively, to the frame members 121 and 122 and pivotally support the rear ends of the side bars 136 and 137 through the medium of a cross shaft 217 (Figure 4) to which the rear ends of the side bars 136 and 137 are connected by suitable bearing brackets. The shaft 217 therefore serves as the pivot axis about which the pick-up conveyor unit 135 pivots in a generally vertical direction between the side bars 121 and 122.

At the lower ends of the side bars 136 and 137 are mounted a pair of ground engaging shoes 146 constructed generally similar to rod weeder shoes, each shoe being secured, as by bolts, to the lower end of the associated side bar. Each shoe also includes a rotatable bushing 149 in which a rod 150 is disposed, the rod 150 being substantially square in cross section and is similar to the weeder rods. Guide plates 152 are secured to the front ends of the side bars 136 and 137 by any suitable means. An elevator or conveyor chain 157 is supported at its lower end on a pair of hardened conical rollers 158 and at its upper end on drive sprockets fixed to the drive shaft 141. The relation between the rod 150 and the chain 157 is substantially the same as explained in detail in the co-pending application mentioned above.

The front end of the conveyor and pick-up unit 135 is raised and lowered relative to the frame 116 by means of a rockshaft 161 supported in brackets carried on a front cross brace 164. A pair of arms 165 and 166 are connected to the rockshaft, as by welding or the like, and the arms 165 and 166 act through a pair of links 169, connected at their lower ends to the side bars 136 and 137, to raise and lower the front end of the conveyor and pick-up unit 135. An actuating arm 173 is also fixed to the rockshaft 161 and is connected by a link 174 to a hand lever 175 pivoted to the frame bar 122 and including detent means operating in cooperation with a sector 176. A balancing spring 177 is connected at one end with the frame and at the other end with the hand lever 175. By rocking the hand lever in one direction or the other, the front end of the loader may be raised or lowered relative to the frame.

The front ends of the guide plates 152 are connected by a U-shaped cross member 179, and to the forward end of each guide plate 162 is pivoted an auxiliary plate 181, the pivot being indicated at 182. The rear end of each of the auxiliary guide plates 181 is connected by a link 183 with the arm 165 or 166 associated therewith whereby, when the front end of the beet loader is raised, as for example, into a transport position, the front end of the auxiliary plate 181 which is pivoted at 182 to the associated guide plate 152 is raised faster than the rear end, since the latter is connected through the link 183 to the arm 166 at a point much closer to the pivot of the rockshaft 161. Therefore, when the beet loader is raised into a transport position, the auxiliary guide plates 181 fold downwardly relative to the main guide plates 152. In this way, the front end of the beet loader can be raised much closer to the cross brace 164 than would otherwise be the case yet the auxiliary guide members 181 serve effectively to guide the beets from the windrow into the loader.

The tractor 2 carries the power take-off shaft 4, mentioned above, and the latter is connected by a universal joint 186 with a short shaft 187, the rear end of the latter being connected by a universal joint 188 to a telescoping shaft 189 supported in bearings 191 and 192 carried on the main frame of the loader. The telescoping shaft 189 is connected by a universal joint 193 with a longitudinal drive shaft 194, the rear end of which is supported in a bearing 195. A sprocket chain 196 is trained over a sprocket 197 fixed to the rear end of the drive shaft 194. The chain 196 is also trained over a sprocket 198 (Figure 3) fixed to the forward end of a longitudinally extending shaft 199, the forward end of which is journaled in a bearing supported by a bracket 201 fixed to a cross bar of the loader frame 116. A chain 205 is trained over a sprocket mounted on the front end of the shaft 199 and connected thereto through a slip clutch 206. The chain 205 is trained over a sprocket 207 fixed to the forward end of a shaft 208 that is supported in a gear case 209. Also mounted in the gear case is a pair of bevel gears 210, one being mounted on the rear end of the shaft 208 and the other being secured to a transverse shaft 212 that extends through the gear case 209 and, at one end, supports a sprocket 213 and at the other end is connected by universal joints 214 and an intermediate shaft 215 to drive a transverse elevator drive shaft 217 on which a pair of sprockets 218, over which the elevator chain 157 is trained, fixed thereto. The elevator unit 135 is, as described above, adapted to be swung upwardly or downwardly about the shaft 217 as a pivot in order to raise and lower the front end of the loader.

As best shown in Figures 3 and 4, a sprocket chain 225 is trained over the sprocket 213 on the shaft 212 and over a sprocket 226 supported for rotation by a bracket 227 on the front portion of the loader frame 116. Preferably, the sprocket 226 is carried on a shaft 228 which is connected through a telescopic shaft section 229 and universal joints 230 to drive the rod 150 (Figure 5). The rear end of the longitudinally extending shaft 199 is provided with a slip clutch 231 by which a sprocket 232 is driven. A chain 233 is trained over the sprocket 232 and over a sprocket 234 fixed to the rear end of a shaft 235. The shaft 235 carries drive sprockets over which a second elevator chain 236 is trained at its lower end. The chain 236 forms a part of a wagon elevator unit indicated in its entirety by the reference numeral 237 and which is supported and arranged substantially like the wagon elevator chain 70 described above in connection with the form of the invention shown in Figure 1, and hence further description is not believed to be necessary, except to point out that the chain 236 is supported by idler rollers (not shown) and by sprockets on the shaft 235 and on a shaft journaled at the upper end of the wagon elevator frame 238 (Figure 3), together with a pair of relatively large idler rollers 239 mounted on a shaft 240, substantially in the same position as the idler rollers 98' of Figure 1. The idlers 239 are spaced from the sprockets on the shaft 235 a distance such that, the upper run of the chain 236 being loose, the chain 236 hangs in a loop L' which receives the beets in the same manner as the loop L shown in Figure 1. In this form of the invention the loop L', serving as a receptacle to receive the beets coming over from the upper end of the elevator chain 157, is augmented by a rear bang-board 241 and a side plate 242 (Figure 4). The portion of the lower or left end of the chain 236 that fastens over the sprockets on the shaft 235 is enclosed by a curved generally longitudinally extending plate section 243.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A loader for beets and the like comprising a first conveyor supported in a downwardly and forwardly extending position, a second cross conveyor disposed in a laterally outwardly and upwardly extending relation with its lower end disposed rearwardly of the upper end of said first conveyor, rotatable means supporting the upper and lower ends of said second conveyor, a transverse shaft for driving the first conveyor, a longitudinally disposed shaft for driving the cross conveyor, a bevel gear set connecting the front end of said longitudinal shaft with one end of said transverse shaft, a power connection for driving the forward end of said longitudinal shaft, and means deriving power from the rear end of said longitudinal shaft for driving the lower rotatable member of said conveyor supporting means, whereby the portion of the cross conveyor immediately rearwardly of said first conveyor hangs in a generally downwardly extending looped portion to serve as a receiver for the crop delivered thereto by said first conveyor.

2. A loader for beets and the like comprising a supporting frame, a first conveyor supported thereon in a downwardly and forwardly extending position, a second cross conveyor comprising a pair of generally longitudinally extending shafts supported for rotation on said frame in laterally spaced relation and disposed rearwardly of and generally laterally outwardly beyond the opposite sides of said first conveyor, an elevator frame section supported adjustably on said frame and pivoted at its lower end on one of said shafts and extending generally away from the other shaft, supporting idler rollers mounted for rotation on said elevator section and including idler rollers at the upper end of the latter and idler rollers on said one shaft, drive sprockets carried on said other shaft, and a conveyor belt having its upper flight supported loosely on said idler rollers and said drive sprockets, said belt being unsupported between said shafts whereby a depending loop is formed in the upper flight of said belt in the portion of the belt immediately rearwardly of said first conveyor so as to serve as a receiver for material discharged from the rear end of said first conveyor, means for driving both of said conveyors, including means for driving the cross conveyor in a direction to feed the belt into said loop.

3. In a beet loader or the like, an elevator comprising supporting means, a pair of shafts carried thereby in spaced apart relation, a frame section pivoted on one of said shafts for generally vertical adjustment and extending in a direction generally away from the other shaft, rotatable idlers supported on said frame section and on said one shaft, belt driving means fixed to said other shaft, a conveyor belt supported on said driving elements and said idlers, the portion of said belt between the idlers on said one shaft and said driving elements being unsupported so as to hang therebetween in a generally downwardly extending material-receiving loop, and means for driving said other shaft so as to rotate said driving elements and actuate the conveyor belt by drawing the lower flight thereof taut and feeding the belt into said loop, whereby said loop is retained between said shafts notwithstanding any irregularities in the resistance to movement of the belt, said driving means comprising a power connection with the forward end of said one shaft, and means defining a power transmitting connection between the rear end of said one shaft and the rear end of the other shaft to which said belt driving means is fixed.

4. A loader for beets and the like comprising a first conveyor, a second cross conveyor disposed in a laterally outwardly and upwardly extending relation with its lower end disposed rearwardly of the discharge end of said first conveyor, rotatable means supporting the upper and lower ends of said second conveyor, a transverse shaft for driving the first conveyor, a longitudinally disposed shaft for driving the cross conveyor, a bevel gear set connecting the front end of said longitudinal shaft with one end of said transverse shaft, a power connection for driving the forward end of said longitudinal shaft, and means deriving power from the rear end of said longitudinal shaft for driving the lower rotatable member of said conveyor supporting means, whereby the portion of the cross conveyor immediately rearwardly of said first conveyor hangs in a generally downwardly extending looped portion to serve as a receiver for the crop delivered thereto by said first conveyor.

ROBERT D. GRIFF.